3,795,711
SORPTION OF PARAXYLENE VAPOR IN PRESENCE OF GASEOUS MODIFIER
George R. Worrell, Media, and James T. O'Toole, Philadelphia, Pa., assignors to Atlantic Richfield Company, New York, N.Y.
No Drawing. Filed June 30, 1972, Ser. No. 268,067
Int. Cl. C07c 7/12; C10g 25/04
U.S. Cl. 260—674 SA                    10 Claims

ABSTRACT OF THE DISCLOSURE

A sorbent containing significant amounts of crystalline, alumino silicate desirably ion exchanged in the ammonium form such as ammonium faujasite preferentially sorbs paraxylene from a process stream containing vapors of a mixture of $C_8$ aromatic isomers. A gaseous modifying agent, such as ammonia, is included in said process stream, whereby the selectivity of the crystalline alumino silicate for the paraxylene is enhanced. After some of the sorbent particles have adsorbed paraxylene, they are treated with a gaseous desorbing agent to provide a vapor stream comprising paraxylene.

BACKGROUND OF THE INVENTION

Field of invention

This invention relates to separation of paraxylene from an admixture of $C_8$ aromatic isomers using a sorbent comprising a crystalline, zeolitic alumino silicate.

Prior art

Amorphous silica gel sorbents proved to be effective in separating aromatic hydrocarbons from hydrocarbon mixtures. Roberts et al., 2,965,687, show that amine modified bentonite can be employed as a sorbent for separation of aromatics or for the separation of paraxylene from mixtures comprising metaxylene. Fleck et al., 3,114,782, teach the use of calcium faujasite for the selective adsorption of metaxylene by a vapor phase treatment at about 350° F., using benzene as a desorbent. Eberly, 3,126,425, shows that in the vapor phase, silica gel has an alpha value of only 1.04 for separating metaxylene from paraxylene, but that the calcium faujasite has an alpha value of as high as 2.32. Both Fleck and Eberly teach that the metaxylene is preferentially sorbed in the calcium faujasite, so that the paraxylene is concentrated in the raffinate.

A group of related patents, including Neuzil 3,558,730, Neuzil 3,558,732, Stein et al. 3,636,121, and Broughton 3,636,180 are concerned with methods of separating paraxylene by sorption onto a crystalline alumino silicate having a mixture of cations (e.g., barium and potassium), using elevated temperatures, superatmospheric pressures, and processing conditions for maintaining the xylene in the liquid state.

Notwithstanding the long-standing literature references concerned with the selective sorption of paraxylene, and notwithstanding the extensive research conducted by many companies, there has been a continuation of the isolation of paraxylene predominantly by refrigeration. Meanwhile, paraxylene has been produced as a tonnage chemical of high purity and the researchers have had the incentive for evaluating all of the plausible approaches for isolating and purifying paraxylene by adsorption.

SUMMARY OF THE INVENTION

In accordance with the present invention, a process stream consists of a mixture of a vapor of $C_8$ aromatics and a controlled portion by volume (10 to 75 percent) of the vapor of a modifying agent and this mixture is passed through a bed of sorbent particles, such sorbent particles containing crystalline alumino silicate previously ion-exchanged to provide more than 50 percent of the ion exchange capacity with cations other than sodium cations, said sorbent selectively adsorbing paraxylene from the mixture. Thereafter, particles comprising such crystalline alumino silicate containing sorbed paraxylene are treated with a gaseous desorbing agent for the desorption of a substantial portion of the paraxylene and the paraxylene fraction is recovered from the gaseous effluent stream comprising such desorbing agent. Thereafter, the particles of sorbent may desirably be treated with a hot inert gas for the removal of the desorbing agent. In preferred embodiments of the invention, the crystalline alumino silicate is a faujasite, and desirably ammonium faujasite or at least significantly in the ammonium exchanged form. The modifying agent is desirably ammonia.

GENERAL DESRIPTION OF PROCESS

A mixture of $C_8$ aromatic hydrocarbons comprising paraxylene is heated to form xylene vapors, which are mixed with a modifying agent to provide a process stream which is directed through a bed of sorbent particles comprising crystalline zeolitic alumino silicate such as ammonium faujasite at a temperature in the 140–200° C. range. After the sorbent particles have adsorbed an appropriate amount of paraxylene, the particles are subjected to desorption treatment making use of a desorbing agent which has a boiling point outside the 130–150° C. boiling point range to remove vapors of paraxylene. Such desorption is sometimes advantageously conducted at a temperature at least 10° hotter than the sorption temperature and within the range of 150–220° C. In certain embodiments, the sorbent particles are thereafter treated with a stream of inert vapor at a temperature at least 10° C. hotter than the desorption temperature and within the range from 150–300° C. to remove desorbent. In other embodiments, the desorbing agent, such as steam, to the extent that it is sorbed on the faujasite sorbent at he desorbent conditions, is retained in the sorbent when the sorbent is reused in the sorption zone.

The sorbent is characterized by the presence of a crystalline zeolitic alumino silicate of the molecular sieve type previously subjected to sufficient dehydration treatment to have pores suitable for sorption of dialkyl benzenes and characterized by pores of the 6–15 angstrom range. The sorbent particles may include matrix components permitting easier management of some properties of the sorbent particles such as particle size, attrition resistance and the like. The sorbent characteristics of the matrix portion of the particles do not prevent the separation of the xylene isomers by the present invention because the amount and type of matrix employed are selected for enhancing such freedom from troublesome interference with the faujasite selectivity of the crystalline zeolite.

Mordenite, faujasite, and offretite are three examples of molecular sieve having pores of the 6–15 angstrom range. Faujasite is the much preferred molecular sieve component. The sodium content of the crystalline zeolite must be less than 50 percent of the ion exchange capacity of the crystalline zeolite and desirably as low as attainable for a composition marketed at the price of a sorbent for paraxylene. The presence of residual sodium of the magnitude of 1 to about 25 mole percent of the ion exchange capacity of the crystalline zeolite generally does not interfere with the sorbent characteristics, and the presence of such minor amounts of sodium can be ignored in the naming of the ion exchanged materials. Faujasite containing ions of potassium and ammonium can be referred to as a potassium-ammonium fujasite even though residual amounts of sodium are also present.

In certain preferred embodiments of the present invention, the faujasitic sorbent particles contain ammonium as the significant cation. As initially prepared, ammonium zeolite contains sorbed water. In the process of removing the water from the ammonium faujasite by conventional heating, a portion of the ammonia is generally also removed, leading to the formation of a product containing both hydrogen faujasite and ammonium faujasite. If, however, the ammonium faujasite is heated in a gas stream containing significant amounts of ammonia, a significant portion of the water can be removed to impart molecular sieve sorptive characteristics while still retaining an amount of ammonia corresponding essentially to the initial ion exchange capacity of the faujasite. Any ammonium faujasite which has been sufficiently dried to have lost more than half of its normal water content can be described as a dehydrated ammonium faujasite.

Particular attention is directed to that feature of the invention whereby the selectivity for the sorption of paraxylene is enhanced by the inclusion of the vapor of a modifying agent in the stream comprising the xylene vapor.

It has been customary to subject faujasite sorbent particles to extensive drying prior to each stage of use as a sorbent, it being recognized that to the extent that the faujasite contained any moisture, its sorptive loading capacity was thereby decreased. Surprisingly, it has been found that the amount of moisture sorbed onto a faujasite adsorbent at a temperature above about 150° C. is not an impossible obstacle to use of the material for selective sorption of paraxylene. Engineering advantages are achieved by the use of faujasite containing the amount of moisture which is sorbed at a moderate drying temperature such as 150° C. Particular attention is directed to the advantages of employing steam as a desorbent agent and removing less than all of the steam desorbing agent prior to reuse as a sorbent for paraxylene.

In some embodiments, the desorption step is conducted at a temperature at least 10° C. above that at which the paraxylene is sorbed selectively.

The sorbent particles, after the substantial removal of the paraxylene by the desorbing agent stream, may in certain embodiments be treated with a gas at a temperature at least 10° C. higher than that scheduled for the desorption step. Such higher temperature, combined with the passage of the stream of gas through the sorbent, has the effect of removing a portion of the desorbent. It is often advantageous to employ an inert gas such as nitrogen for the gas stream during the removal of the desorbent, but the most important feature of the desorbent removal procedure is the utilization of a temperature of at least 10° hotter than the desorption step. In some cases, nitrogen can be employed as both the desorbent and as the gas for removing the desorbent or under other appropriate conditions, steam can be employed as both the desorbent and as the gas for removing the steam, the steps being distinguished by the differences in temperature.

The ability of a sorbent to selectively removed one component from a two component mixture can be designated by an alpha factor. For each of the four components in the mixture of $C_8$ aromatics, there is an alpha for each of the other three components. From a practical standpoint the critical separation is the separation of the para from the meta isomer. The ratio of the para to meta in the sorbent can be divided by the ratio of the para to meta in the raffinate to provide the alpha factor for para to metaxylene. The teaching of Fleck, 3,114,782, is that such alpha factor is less than one for calcium faujasite when the separations are conducted in the vapor state; that is, the meta isomer is preferably sorbed by calcium faujasite. A significant feature of the present invention is the surprising discovery that the para isomer is preferentially sorbed by ammonium faujasite when treated with mixtures of metaxylene and paraxylene, so that ammonium faujasite has an alpha greater than one. Either the zeolite X or the zeolite Y form of faujasite or other synthetic faujasite structures may be employed in accordance with the availability of the faujasite in suitable particle form. Moisture content, ammonia content, hydrogen cation content, metallic cation content and related criteria are significant factors, but the ratio of silica to alumina appears to be of relatively minor importance in the effectiveness of ammonium faujasite in selectively sorbing paraxylene.

DESCRIPTION OF PREFERRED EMBODIMENTS

The invention is further clarified by reference to a plurality of examples.

EXAMPLES 1–11

Previous literature indicates that a sodium faujasite such as a zeolite X or zeolite Y which has been thermally dehydrated to provide a molecular sieve type of sodium faujasite is substantially useless in separating paraxylene from liquid admixtures with metaxylene, when treated at about room temperature, the alpha factor being about 1.01. Thus the sodium faujasite molecular sieve does not favor the separation of the xylenes on the same basis that the xylenes would be separated from admixtures with anthracene and naphthalene. Such data are designated as control A in Table 1.

Dehydrated ammonium faujasite prepared by careful drying of the hydrated ammonium faujasite resulting from three stages of hot aqueous ammonium exchange of a sodium Y-type zeolite was tested as a sorbent for a liquid xylene mixture at room temperature. The residual sodium oxide content of the ammonium faujasite was only about three percent, indicating that the ammonium cations represented about 80 percent of the ion exchange capacity of the faujasite. It is the general practice to ignore the presence of the sodium cation in naming a faujasite when the sodium constitutes less than about 25 percent of the ion exchange capacity of the faujasite.

A bed of about 8 cc. of the dried ammonium faujasite was treated by a stream of liquid containing about equal molar amounts of metaxylene and paraxylene at an hourly space velocity of about four (about 32 cc. per hour), whereby the paraxylene was selectively sorbed onto the ammonium faujasite and a metaxylene enriched raffinate was withdrawn from the bed of ammonium faujasite. This test was designated as Example 1. The separation factor or alpha was found to be 1.5, or significantly advantageous over the 1.01 alpha for sodium faujasite.

A sample of ammonium faujasite was dried at 600° F. and evaluated as a sorbent for separating paraxylene. A bed of 100 cc. of the ammonium faujasite particles was treated with 70 cc./hr. (hourly space rate of 0.6 v./v./hr.) of mixed xylene vapors at 320° F. to establish an alpha factor of 1.25 as a test designated as Example 2. Substantially the same general conditions, but making the single modification of including 13 percent ammonia in the xylene stream, were employed in establishing an alpha factor of 2.12 in Example 3. The improvement in effectiveness by using ammonia as a modifying agent is quite significant. The paraxylene was desorbed from the ammonium faujasite by steam at 350° F., which was more than 18° F. hotter than the sorption temperature.

In order to determine whether the surprisingly advantageous results were attributable to the uniqueness of ammonia, tests were conducted using nitrogen as the modifying agent. The sodium faujasite (type Y) was mixed with an aqueous solution and an aluminaceous component and extruded, cut, and calcined to provide faujasite pellets containing about 20 percent alumina matrix. Ammonium exchange of such pellets followed by 300° F. drying, provided ammonium faujasite pellets having sorptive characteristics (based upon faujasite content) approximately equivalent to the other samples of dried ammonium faujasite. Thus, the alumina matrix did not interfere with the selective sorption of paraxylene by the pellets.

A bed of 80 cc. of such dried ammoium faujasite pellets was employed in a series of examples, the desorption being effective in restoring the bed essentially to initial activity prior to each example. Using nitrogen as the modifying agent in a concentration of 60 percent by volume (40 percent mixed xylenes) and a flow rate of 55 cc. of xylenes per hour (0.69 v./v./h. space velocity) at a sorption temperature of 310° F. led to the measurement of an alpha of 1.51 in Example 4, thus evidencing that modifying agents other than ammonia had significantly advantageous improvement in the paraxylene separation. The paraxylene was desorbed with steam at a temperature of 350° F., hotter than the sorption temperature.

In order to determine the suitability of including a significant (e.g., more than about 20 percent) proportion of steam in the modifying agent, a mixture consisting of about 38 percent xylene, 20 percent ammonia, and 42 percent steam was directed through a bed of ammonium faujasite at 315° F., and the alpha separation factor for para to meta was 1.20, or lower than in the absence of a modifying agent. This control test is identified as control B in Table 1.

TABLE 1

|  | Cation | Modifier | Percent | ° F. | Alpha |
|---|---|---|---|---|---|
| Controls: |  |  |  |  |  |
| A | Na | None | 0 | 70 | 1.01 |
| B | $NH_4$ | $H_2O$ | 42 |  |  |
|  |  | $NH_3$ | 20 | 315 | 1.20 |
| Examples: |  |  |  |  |  |
| 1 | $NH_4$ | None | 0 | 70 | 1.50 |
| 2 | $NH_4$ | None | 0 | 320 | 1.25 |
| 3 | $NH_4$ | $NH_3$ | 13 | 320 | 2.12 |
| 4 | $NH_4$ | $N_2$ | 60 | 310 | 1.51 |

A series of paraxylene purification tests were conducted using the 80 cc. bed of ammonium faujasite particles of Example 4 and varying the concentration of ammonia, the space rate and the sorption temperature, and it was shown that the modifying agent permitted measurement of alphas above 1.25 at a variety of conditions. Some variations in results were not readily explainable, but the overall results could be interpreted as indicating that high ammonia concentrations, low space rates, and relatively high sorption temperatures offered some advantages. In each test, the paraxylene was desorbed by the flow of steam at a temperature at least 20° F. hotter than the sorption temperature. Data relating to the series of tests are shown in Table 2.

TABLE 2

|  | Cc./hr. | Percent $NH_3$ | ° F. | Alpha |
|---|---|---|---|---|
| Example: |  |  |  |  |
| 5 | 71 | 71 | 320 | 1.70 |
| 6 | 50 | 63 | 330 | 1.70 |
| 7 | 73 | 70 | 260 | 1.45 |
| 8 | 73 | 70 | 310 | 1.65 |
| 9 | 74 | 35 | 310 | 1.45 |
| 10 | 70 | 70 | 410 | 1.47 |
| 11 | 69 | 71 | 310 | 1.75 |

Because the ammonia modifying agent was advantageous in the series of examples, the evidence was interpreted as indicating that such use of ammonia was beneficial in separation paraxylene by adsorption on ammonia faujasite.

EXAMPLES 12-14

Extruded rods of faujasite containing sodium zeolite Y and a small amount of clay binder and marketed as Linde SK-40 were crushed to provide granules. Potassium faujasite sorbent particles were prepared from such granules by ion exchange. The potassium faujasite was dried at 800° F. and thereafter employed in the vapor phase adsorption of a mixture of $C_8$ aromatic hydrocarbons. A bed of 109 grams of potassium faujasite granules was treated with the vapors of a mixture comprising a modifying agent and $C_8$ hydrocarbons containing 25 percent of each of ethylbenzene, para-meta and orthoxylene. The faujasite bed was maintained at 320° F. By using 35 percent ammonia in the xylene vapor stream, the alpha for the separation of paraxylene from metaxylene was 1.51. By inclusion of 73 percent ammonia in the vapor stream, the alpha separation factor was 2.13. The potassium faujasite had a loading capacity for absorbing an amount of paraxylene corresponding to about 10 percent of the weight of the dry bed when the modifying agent concentration was 73 percent. Such data indicate that the presence of the modifier is highly advantageous when using potassium faujasite as the sorbent, and that the utility of the ammonia is not limited to the combination with ammonium faujasite. The potassium faujasite was prepared in a manner ot remove more than half of the sodium content of the initial faujasite. This requirement for removing more than 50 percent of the cation capacity to be other than sodium is a necessary requirement in accordance with the present invention. After each of the tests in which the mixture of $C_8$ aromatics was directed as a vapor stream through the fixed bed of faujasite containing sorbent, the paraxylene component was removed by passage of steam at a temperature in the 105–300° C. range.

EXAMPLE 15

Pellets of sodium faujasite are ion exchanged with a hot aqueous solution of ammonium carbonate to provide ammonium faujasite particles. Ammonium form ion exchange resin particles are dispersed in aqueous ammonium hydroxide and agitated with the ammonium faujasite particles to further reduce the sodium content of the ammonium faujasite pellets, thereby preparing ammonium faujasite pellets having a lowered sodium content. The ammonium faujasite pellets are dried and treated with an aqueous solution of potassium carbonate by the no excess impregnation technique to provide potassium ammonium faujasite particles containing, after drying at about 300° F., approximately equal molar concentrations of the potassium ion and ammonium ion. The thus prepared potassium ammonium faujasite particles are employed as a sorbent for the separation of paraxylene from a stream of $C_8$ aromatic hydrocarbon vapor containing about 67 percent ammonia at about 320° F. The presence of the ammonia as a modifying agent is advantageous, as is the utilization of the faujasite containing approximately equal molar concentrations of ammonium ion and potassium ion. The paraxylene is desorbed by steam at about 350° F. By a series of tests, it is established that faujasite sorbents for paraxylene separation desirably contain ammonium ion as a part of the ion exchange capacity of the faujasite, and that the beneficial effects of such ammonium faujasite are noticeable throughout the range from 10 percent to 99 percent of the ion exchange capacity of the faujasite.

EXAMPLE 16

The procedure of Example 15 is modified to prepare a faujasite pellet containing approximately equal molar concentrations of barium and potassium. The utilization of about 67 percent of modifying agent in the vapor stream is advantageous in the selective sorption of paraxylene from a 320° F. vapor stream of $C_8$ aromatic hydrocarbons using such barium potassium faujasite. Good results are obtained using nitrogen as the modifying agent but particularly advantageous results are obtained using ammonia as the modifying agent. In each case, the paraxylene is desorbed from the sorbent particles by treatment with a stream of steam at a temperature at least 20° hotter than the sorption temperature.

EXAMPLE 17

A sample of tetramethyl ammonium offretite is ion exchanged with ammonium carbonate solution to provide an ammonium offretite. The ammonium offretite is employed as the sorbent for the seelctive sorption of paraxylene from a vapor stream consisting essentially of 67 percent ammonia and 33 percent $C_8$ aromatic hydrocarbons at a temperature of 350° F. The paraxylene is desorbed from the ammonium offretite at a temperature of 380° F. using diethylbenzene as the desorbent. Thereafter the diethylbenzene is desorbed from the ammonium offretite by a stream of steam at 410° F.

EXAMPLE 18

Ammonium mordenite is employed as a selective sorbent for paraxylene at 320° F. from a vapor stream containing equal amounts of ammonia and $C_8$ aromatic hydrocarbons. The paraxylene is desorbed from the ammonium mordenite by a stream of benzene at a temperature of 380° F., or more than 20° F. hotter than the sorption temperature. The ammonium mordenite is prepared in such a manner as to contain less than 50 mol percent of the cations of sodium.

EXAMPLE 19

Cracking catalyst particles comprising about 25 percent ammonium faujasite in alumino silicate matrix and having a fluidizable size are maintained as a fluidizable bed at about 320° F., using ammonia as the principal fluidizing gas. The cracking catalyst particles contain an amount of sodium which is less than 50 percent of the ion exchange capacity of the faujasite components of the cracking catalyst particles. A sorption test is conducted by including $C_8$ aromatic hydrocarbons in the ammonia gas, and such xylene concentration is increased until it constitutes approximately 33 percent by volume of the gas stream supplied to the fluidized bed. Regenerated particles are supplied to the fluidized bed at a rate corresponding to the withdrawal of a stream of the fluidized particles. In a desorption zone, the stream of withdrawn fluidized particles is injected into a fluidized bed in which steam at a temperature of 350° F. is the fluidizing gas. A stream of desorbed fluidized particles is withdrawn from the desorption zone and directed to a desorbent removal zone (or regeneration zone) consisting of a fluidized bed having nitrogen as the fluidizing gas, such bed being maintained at 410° F. Steam is thus withdrawn from the particles in the desorption removal or regeneration zone. A stream of the regenerated particles is recirculated to the sorption zone. The presence of the ammonia modifying agent in the sorption zone inhibits the sorption of $C_8$ aromatic hydrocarbons on matrix portions of the cracking catalyst particles, whereby the faujasite component is effective in the selective sorptions of the paraxylene from the stream of $C_8$ aromatic hydrocarbons. Because the cracking catalyst particles have outstanding attrition resistance and resistance to steaming, they are advantageous in the application of the fluidized bed to the paraxylene sorption procedure.

Instead of using fluidized particles, a compact bed of granular faujasite-containing particles can be employed as the sorbent, and circulated from a sorption zone to a desorption zone to a regeneration zone and back to the sorption zone, using any of the approaches suitable for the transfer of granular particles from one zone to another. Multi-stage sorption methods benefit particularly from the combination of continuous flow of the fluids through the appropriate zones and sorbent particle circulation through the required particle treatment zones.

EXAMPLE 20

Ammonium faujasite is heated at 900° F. to prepare pellets comprising hydrogen faujasite. The particles are utilized at 320° F. for selective sorption of paraxylene from a stream of $C_8$ aromatic hydrocarbons. Low separation factors are observed both with and without the inclusion of ammonia as a modifying agent in the process stream. By a series of tests it is established that the ammonium faujasite containing sorbent particles should be maintained at temperatures below 260° C. (500° F.) to minimize the formation of hydrogen faujasite and/or decationized faujasite anhydride sites.

Granular particles of sodium faujasite are ion exchanged to contain about equal molar proportions of potassium cation and ammonium cation and to contain only a very small amount of sodium cation. A bed of such particles, maintained at a temperature in the 140–200° C. range is employed for the selective sorption from a stream containing about 3 moles of ammonia per mole of $C_8$ aromatic hydrocarbon. The desorption of the paraxylene is conducted at a temperature of 150–220° C., such desorption temperature being at least 10° C. hotter than the sorption temperature.

Certain limits appear to be significant on the basis of the data in the examples and a series of tests. The crystalline silicate zeolite must be ion exchanged to contain an amount of sodium ions which assuredly is less than 50 percent of the ion exchange capacity of the sorbent particles. The modifying agent must not have more than 20 percent steam, and should desirably contain as little steam as is convenient from an engineering standpoint. The modifying agent is present in a volume percent or mole percent which is within a range from about 10 percent to about 75 percent of the process stream, the balance being the hydrocarbons being purified to separate the paraxylene. The desorbing of the paraxylene from the sorbent must be achieved by the use of a hot desorbing agent vapor. In certain embodiments, desorbing temperature is within the range from about 150° C. to about 220° C., such temperature being at least 10° C. hotter than the sorption temperature and the desorbing agent is removed in a regeneration zone at a temperature at least 10° C. hotter than the desorbing zone.

Various modifications of the invention are possible without departing from the scope of the appended claims.

The invention claimed is:

1. In the method of separating paraxylene from a feedstock mixture comprising paraxylene and at least one other of the $C_8$ aromatic isomers, wherein said feedstock mixture contacts a bed of particles of crystalline-faujasite-containing-sorbent in a sorption zone at a preselected sorption temperature to selectively absorb paraxylene in the 8–15 angstrom pores of said sorbent particles and to provide a raffinate from which at least a portion of the paraxylene has been depleted, and wherein an extract containing paraxylene of enhanced purity is desorbed from said sorbent particles by treatment with a desorbent having a boiling point remote from the boiling point of paraxylene, the improvement which includes:

(a) controlling the composition of the sorbent particles so that more than 50 percent of the ion exchange capacity of the sorbent particles at ambient temperature is ion exchanged to contain cations of the group consisting of potassium, ammonium, barium, and mixtures thereof;

(b) directing a stream of vapors of feedstock in admixture with a controlled mol percent of vapor of a modifying agent which is within the range from about 10 mol percent to about 75 mol percent through the bed of sorbent particles, at a sorption temperature within the range from about 150° C. to about 200° C. thereby enhancing the selectivity of the sorbent particles for paraxylene, said modifying agent being predominantly ammonia and containing less than 20 percent steam; and (c) desorbing paraxylene from the sorbent particles by a stream of hot vapor of a desorbing agent.

2. The method of claim 1 in which from about 10 percent to about 99 percent of the ion exchange capacity of the sorbent particles at ambient temperature is ion exchanged to contain ammonium ion.

3. The method of claim 1 in which the modifying agent is ammonia.

4. The method of claim 1 in which potassium constitutes the predominant metallic cation in the crystalline faujasite and in which the molar concentration of ammonium ion is about equal to the potassium ion concentration.

5. The method of claim 1 in which the sorbent is ammonium faujasite and in which the temperature of the sorption zone, the temperature of the desorbing zone, and the temperature of the desorbent removal zone are each maintained below 260° C. to minimize formation of decationized faujasite anhydride sites from the sites of nonmetallic cations.

6. The method of claim 1 in which the sorbent particles are of granular size.

7. The method of claim 1 in which the sorbent particles are of fluidizable size, and a fluidized bed of particles serves as the sorption zone.

8. The method of claim 1 in which the paraxylene is desorbed at a temperature within the range from about 150° C. to 220° C., such temperature being at least 10° C. hotter than the sorption temperature, and subsequent to desorption of paraxylene from the sorbent particles and prior to reuse in the sorption zone, the sorbent particles are heated by an inert vapor stream at a temperature within the range from 160° C. to 300° C. to remove desorbent, said desorbent being removed at a temperature which is at least 10° C. hotter than the temperature of desorbing the paraxylene.

9. The method of claim 1 in which the faujasite particles contain about equal proportions of potassium cation and ammonium cation, in which said sorbent particles are of granular size in a relatively compact bed, in which vapors consisting of about 75 percent ammonia as a modifying agent and about 25 percent feedstock are directed into the sorption zone at a temperature in the 140–200° C. range and in which paraxylene is desorbed from the sorbent by treatment with steam at a temperature in the 150–220° C. range, such desorption temperature being at least 10° C. hotter than the sorption temperature.

10. In the method of separating paraxylene from a feedstock mixture comprising paraxylene and at least one other of the $C_8$ aromatic isomers, wherein said feedstock mixture contacts a bed of particles of crystalline-faujasite-containing-sorbent in a sorption zone at a preselected sorption temperature to selectively absorb paraxylene in the 8–15 angstrom pores of said sorbent particles and to provide a raffinate from which at least a portion of the paraxylene has been depleted, and wherein an extract containing paraxylene of enhanced purity is desorbed from said sorbent particles by treatment with a desorbent having a boiling point remote from the boiling point of paraxylene, the improvement which includes:

(a) employing in the sorption zone particles containing ammonium faujasite as the only significant crystalline zeolite component, such ammonium faujasite containing particles being the only significant sorbent in the sorption zone.

References Cited

UNITED STATES PATENTS

| | | | |
|---|---|---|---|
| 3,699,182 | 10/1972 | Cattanach | 260—674 |
| 3,662,014 | 5/1972 | Avrillon et al. | 260—674 |
| 3,531,400 | 9/1970 | Wehner et al. | 208—310 |
| 3,668,266 | 6/1972 | Chen et al. | 260—674 |
| 3,626,020 | 12/1971 | Neuzil | 260—674 |
| 3,007,545 | 11/1961 | Kimberlin et al. | 260—676 |

DELBERT E. GANTZ, Primary Examiner

C. E. SPRESSER, JR., Assistant Examiner

U.S. Cl. X.R.

55—67, 75; 208—310